United States Patent [19]

Reynders et al.

[11] Patent Number: 5,344,488
[45] Date of Patent: Sep. 6, 1994

[54] PIGMENTS

[75] Inventors: Peter Reynders, Griesheim; Hans D. Brückner, Darmstadt, both of Fed. Rep. of Germany

[73] Assignee: Merck Patent Gesellschaft mit beschrankter Haftung, Darmstadt, Fed. Rep. of Germany

[21] Appl. No.: 979,860

[22] PCT Filed: Jun. 10, 1992

[86] PCT No.: PCT/EP92/01295
§ 371 Date: Feb. 24, 1993
§ 102(e) Date: Feb. 24, 1993

[87] PCT Pub. No.: WO93/00408
PCT Pub. Date: Jan. 7, 1993

[30] Foreign Application Priority Data

Jun. 24, 1991 [DE] Fed. Rep. of Germany ....... 4120747

[51] Int. Cl.$^5$ .............................................. C04B 14/00
[52] U.S. Cl. .................................. 106/425; 106/415; 106/418; 106/459
[58] Field of Search ............... 106/415, 418, 419, 425, 106/459

[56] References Cited

U.S. PATENT DOCUMENTS 4,956,019 9/1990 Noguchi et al. ................. 106/415

FOREIGN PATENT DOCUMENTS 208578 12/1983 Czechoslovakia .
0142695 5/1985 European Pat. Off. .
0256417 2/1988 European Pat. Off. .
0327739 8/1989 European Pat. Off. .

OTHER PUBLICATIONS

Nedorost et al., "Nacreous silver pigment with a rutile structure", *Chemical Abstracts*, vol. 100, No. 2 (May 28, 1984), Abstract No. 177278f, pp. 137–138.

*Primary Examiner*—Karl Group
*Assistant Examiner*—Chris Gallo
*Attorney, Agent, or Firm*—Millen, White, Zelano, & Branigan

[57] ABSTRACT

The application relates to pigments based on plate-like substrates which, if desired, are covered with one or more layers comprising metal oxides or metal oxide mixtures, zinc oxide being deposited on the surface of the substrates with the formation of a not entirely continuous layer.

10 Claims, No Drawings

PIGMENTS

The invention relates to pigments based on plate-like substrates covered with an iron oxide or iron oxide-containing mixture on which zinc oxide is deposited.

Pigments of this type are known, for example, from EP 0,256,417. These pigments are prepared by adding an aqueous zinc nitrate solution to an aqueous suspension of muscovite platelets coated with iron oxide and titanium dioxide and maintaining the reaction solution obtained at a pH of, for example, 8–9 and an elevated temperature of, for example, 80° C. for, for example, 80 minutes. The coated pigments are separated off, dried and ignited at 650° C. for, for example, one hour.

Pigments of this type have favourable properties, such as, for example, high gloss, high brightness, good skin compatibility, antibacterial action and high absorption in the UV and have therefore been proposed for industrial applications and in particular also for cosmetic applications. A disadvantage is that conventional ZnO/mica pigments tend to agglomerate, which constitutes a problem, since plate-like pigments cannot be dispersed like conventional pigments by subjecting them to high shearing forces, since this leads to a destruction of the platelet structure. Furthermore, it would be desirable to provide pigments which, in addition to the excellent properties of an external ZnO topcoat—good skin compatibility, antibacterial action, favourable optical absorption properties—have a surface colour; conventional ZnO/mica pigments have this desirable combination of properties only very insufficiently.

Furthermore, the processes previously used for preparing ZnO/mica pigment have in many cases disadvantages; thus, for example, in the process described in EP 0,256,417, a zinc nitrate solution is used, which is undesirable for reasons of environmental protection.

One object of the present invention was to provide ZnO pigments, based on plate-like substrates, which do not have, or have only to a small extent, the disadvantages of conventional pigments. A further object of the present invention was to provide preparation processes which are superior to conventional processes. Further objects of the present invention are obvious to one skilled in the art from the detailed description which follows and the examples.

It has now been found that these objects can be achieved by the pigments according to the invention and the preparation process according to the invention.

Accordingly, the invention relates to pigments based on plate-like substrates which, if desired, are covered with one or more layers comprising metal oxides or metal oxide mixtures, zinc oxide being deposited on the surface of the substrates with the formation of a not entirely continuous layer.

The invention furthermore relates to a process for the preparation of these pigments, characterised in that the plate-like substrates, which are covered with one or more layers comprising metal oxides or metal oxide mixtures, are suspended in water, in that an acid aqueous solution of zinc chloride or zinc sulfate is added to this suspension at a pH favourable for the deposition of zinc oxide, this pH being kept substantially constant by simultaneous addition of a base, and in that the product is separated off, washed, dried and, if desired, ignited.

The invention furthermore relates to the use of the pigments according to the invention for pigmenting plastics, coatings or cosmetics.

The pigments according to the invention are based on plate-like and preferably transparent or semi-transparent substrates consisting of, for example, layered silicates, such as mica, talc, kaolin, glass or other comparable minerals. Apart from these, metal platelets such as, for example, aluminium platelets or plate-like metal oxides, such as, for example, plate-like iron oxide or bismuth oxychloride are also suitable. The plate-like substrates typically have a thickness between 0.1 and 5 $\mu$m and in particular between 0.2 and 4.5 $\mu$m. The expansion in the other two dimensions is usually between 1 and 250 $\mu$m and in particular between 2 and 200 $\mu$m.

The plate-like substrates can be directly coated with zinc oxide, transparent or semi-transparent substrates being particularly preferred for this purpose, in particular mica, talc, kaolin and glass, and plate-like metal oxides, in particular iron oxide platelets. However, the plate-like substrates can also be covered first with one or more layers comprising metal oxides or metal oxide mixtures, such as, for example, titanium oxide, zirconium oxide, iron oxide, tin oxide and/or further metal oxides, before the not entirely continuous outer zinc oxide layer is applied. These inner layers comprising metal oxides or metal oxide mixtures are formed continuously, i.e. the quotient of the inner surface area of the particular layer and the outer surface area of the previous layer or of the plate-like substrate is virtually 1 and in any case not less than 0.95.

The surface of substrates coated with metal oxides or metal oxide mixtures can furthermore be modified by applying polar organic compounds, such as, for example, carboxylic acids, or by applying inorganic polar radicals, such as, for example, phosphates.

Pigments according to the invention which do not have more than 2 and in particular only one or no further layer comprising one or more metal oxides below the outer non-continuous zinc oxide layer are particularly preferred. Pigments having an inner continuous metal oxide layer comprising titanium oxide, zirconium oxide, iron oxide and/or zinc oxide are very particularly preferred.

Processes for depositing the metal oxides mentioned and further metal oxides are described, for example, in DE 1,959,998, DE 2,215,191, DE 2,244,298, DE 2,313,331, DE 2,522,572, DE 3,137,808, DE 3,137,809, DE 3,151,343, DE 3,151,354, DE 3,151,355, DE 3,211,602 or DE 3,235,017.

To produce the outer non-continuous zinc oxide layer, an aqueous suspension of the plate-like substrate, which may be covered with one or more layers comprising metal oxides or metal oxide mixtures, is brought to a pH of typically 6–9, which is favourable for the deposition of zinc hydroxide, by addition of a base, such as, for example, NaOH or KOH. The suspension is then heated to the desired reaction temperature; the zinc hydroxide deposition is usually carried out at slightly elevated temperatures of between 50° and 100° C. However, it is also possible for the reaction to take place at lower temperatures, for example at room temperature, or even at elevated temperatures, in this case usually under elevated pressure.

An aqueous, in general acid suspension of a suitable zinc salt is then slowly added to the initially introduced suspension. Preferably, $ZnCl_2$, for example in an aqueous HCl solution, or $ZnSO_4$, for example in an aqueous sulphuric acid solution, are added dropwise; the use of $Zn(NO_3)_2$ is in general undesirable for reasons of environmental protection.

The rate of addition selected is such that the coating can be stopped after reaching the desired degree of coverage with zinc oxide. This degree of coverage $\theta$ is defined as the quotient from the sum of the areas of the not entirely continuous zinc oxide or zinc oxide hydrate regions and the outer surface area of the substrate below or the metal oxide or metal mixed oxide layer below. The degree of coverage can be determined, for example, from a scanning electron microscopy photograph of an arbitrarily selected portion of the pigment surface by counting. Instead of the degree of coverage, which can only be determined in a relatively complicated manner, it is often possible also to use the quotient from the ZnO weight and, for example, the weight of the substrate for characterising the zinc oxide layer; this quotient is often, at least in a first approximation, proportional to the degree of coverage and can, after suitable calibration, also be used.

The degree of coverage is preferably between 0.02 and 0.95. Degrees of coverage between 0.05 and 0.8 are very particularly preferred. The ZnO can form fairly large crystallites of different shapes, such as, for example, needle-shaped crystallites (needle diameter typically about 0.1-2 μm), or alternatively it can also be present, for example, in the form of dots or spots formed from microcrystallites (microcrystallite diameter typically <5 μm).

Suitable values for the rate of addition are of course dependent on the size of the batch; one skilled in the art can obtain typical values from the examples, although the data given therein are only understood to be exemplary and are not intended to limit the invention. The pH of the reaction suspension is substantially maintained at the initially adjusted value between 6 and 9 by simultaneous addition of a base.

The coated substrate is then separated off, washed, dried and, if desired, ignited.

It has now been found that the morphology of the zinc oxide layer is greatly affected by the composition of the metal oxide or metal mixed oxide layer below or—in the case of non-pre-coated substrates—by the nature of the substrate. Furthermore, process parameters such as, for example, omission of the ignition step, the temperature programme used, the drying or ignition temperature, and the like, play an important role.

If the outer zinc oxide layer is deposited, for example, on an iron oxide layer or a mixed oxide layer containing iron oxide and the pigment obtained is, after being separated off, only dried or ignited at relatively low temperatures, small needle-shaped ZnO crystallites are formed. These crystallites are randomly distributed on the layer below and they are bonded to the layer at one or more places; in this case, the degree of coverage with ZnO is defined as the quotient from the sum of the base areas of the ZnO crystallites or the places bonded to the layer and the outer surface area of the layer. Unlike substrates covered entirely with ZnO, i.e. in a continuous layer, these pigments according to the invention show only a slight tendency to agglomeration. Despite this surface morphology, the pigments have the gloss typical for plate-like pigments, originating from the iron oxide layer or mixed oxide layer containing iron oxide lying below the ZnO layer. At very low degrees of coverage with ZnO, the colour of the pigment corresponds more or less to the colour of the iron oxide layer or mixed oxide layer containing iron oxide and increasingly lightens with increasing degree of coverage. Moreover, these pigments have the typical properties of zinc oxide pigments, such as good skin compatibility, antibacterial action and strong absorption in the UV. Pigments according to the invention in which the ZnO layer has been applied to an iron oxide layer or mixed oxide layer containing iron oxide and which have been dried and ignited at relatively low temperatures, or only dried, are distinguished by excellent properties and are particularly preferred.

If in contrast the pigment described above, after it has been separated off from the reaction suspension and after it has been dried, is ignited at temperatures of more than 600° C. and in particular of not less than 750° C., partial or complete conversion of the zinc oxide into zinc ferrites is observed depending on the degree of coverage with zinc oxide. The morphology of this zinc ferrite layer can deviate more or less from that of the ZnO layer, it being possible for the change in morphology to be affected in particular by the ignition temperature, the heating and cooling programme and also by the set degree of coverage with ZnO. These pigments having an outer, not entirely continuous zinc ferrite layer or layer containing zinc ferrite are particularly preferred and are provided by this invention.

If the zinc oxide layer is applied to a titanium dioxide layer or a mixed oxide layer containing titanium dioxide, no needle-shaped ZnO crystallites are formed but the ZnO is present in the form of small, more or less flat dots. No needle-shaped morphology of the ZnO crystallites can be obtained in this case by igniting the pigment or varying the ignition temperature or the temperature programme. This is also true if the outermost metal oxide or mixed oxide layer contains pseudobrookite. These pigments too show less tendency to agglomeration compared with pigments completely coated with ZnO. Furthermore, in these pigments, the advantageous properties of plate-like mica pigments are combined with those of ZnO pigments, so that these pigments are particularly preferred.

Further specific embodiments of the pigments according to the invention are available to one skilled in the art without the need for an inventive step. The essence of the present invention is that a non-continuous ZnO layer is produced on the substrate surface or the surface of a metal oxide or metal oxide mixture. The morphology of this ZnO layer is determined by the material of the surface below and by the deposition and ignition conditions and can be varied within certain limits with regard to the particular application. The properties of the pigments according to the invention are determined not only by the ZnO layer but also by the layer below, giving rise to a combination of interesting colour and gloss effects having the favourable properties of ZnO pigments.

The pigments according to the invention thus constitute a substantial enlargement of the range of industrially useful pigments and as a result they acquire considerable economic importance.

The examples listed below are intended to illustrate the invention without limiting it.

EXAMPLE 1

50 g of Iriodin 504 (mica coated with hematite, platelet diameter 10–60 μm, commercial product from E. Merck, Darmstadt) are suspended in 1 l of fully deionised water. The suspension is heated to 75° C. and brought to a pH of 7 by adding a 10% aqueous NaOH solution. A solution of 15% by weight of $ZnCl_2$ in dilute aqueous hydrochloric acid is then added dropwise at the rate of about 3 ml/min, while the pH of the suspension is kept constant at a pH of 7 by simultaneous addition of a 32% aqueous NaOH solution. The amount of $ZnCl_2$ added can easily be controlled in such a manner that $ZnO_2$ degrees of coverage between 0 and 1 are obtained.

The coated substrate is then separated off, washed and dried at 110° C. The colour of the pigment obtained varies between dark red (pure Iriodin 504, $\theta=0$) and a light orange ($\theta=1$). The ZnO forms small needle-shaped crystallites which are bonded to the surface below in one or more places. The pigments are distinguished by a low tendency to agglomeration.

EXAMPLE 2

Example 1 is repeated, except that the coated substrate is ignited, after drying, at 800° C. for 30 minutes. As soon as the degree of coverage with ZnO becomes greater than $\theta > 0.05$, complete conversion of ZnO to $ZnFe_2O_4$ is observed in the X-ray diffraction pattern. These pigments show a stronger orange colour compared with those from Example 1.

EXAMPLE 3

Example 1 is repeated, except that the substrate used is Iriodin 525 (mica coated with haematite, platelet diameter 5–20 μm, commercial product from E. Merck, Darmstadt).

EXAMPLE 4

Example 1 is repeated, except that the substrate used is Iriodin 100 (mica coated with anatas, average diameter of the substrate particles 10–60 μm; commercial product from E. Merck, Darmstadt), and the ZnO deposition is carried out at a pH of 9. ZnO forms small, essentially flat dots on the surface below. The colour of the pigments obtained is substantially that of the substrates or is paler than these.

We claim:

1. Pigments based on plate-like substrates which, optionally, are covered with one or more layers comprising metal oxides or metal oxide mixtures, zinc oxide being deposited on the surface of the substrates with the formation of a discontinuous layer.

2. Pigment according to claim 1, in which the quotient from the sum of the areas of the discontinuous zinc oxide regions and the optionally coated substrate area below, which is defined as the degree of coverage with zinc oxide $\theta$, is between 0.02 and 0.95.

3. Pigment according to claim 1, in which the substrates are covered with an iron oxide layer or a mixed oxide layer containing iron oxide, on which zinc oxide has been deposited in the form of small needle-shaped crystallites.

4. Pigments according to claim 1, in which the substrates are covered with a titanium oxide layer or a mixed oxide layer containing titanium oxide, on which zinc oxide has been deposited in the form of small, essentially flat dots.

5. Pigments based on plate-like substrates which, optionally, are covered with one or more layers comprising metal oxides or metal oxide mixtures, containing on the surface of the substrates a discontinuous zinc ferrite layer or a layer containing zinc ferrite.

6. Process for the preparation of pigments according to claim 1, characterised in that the plate-like substrates, which are covered with one or more layers comprising metal oxides or metal oxide mixtures, are suspended in water, in that an acid aqueous solution of zinc chloride or zinc sulfate is added to this suspension at a pH favourable for the deposition of zinc oxide, this pH being kept substantially constant by simultaneous addition of a base, and in that the product is separated off, washed, dried and, optionally, ignited.

7. Process for the preparation of pigments according to claim 3, characterised in that substrates covered with an iron oxide layer or a layer containing iron oxide are used and these substrates are suspended in water, an acid aqueous solution of chloride or zinc sulfide is added to this suspension at a pH favorable for the deposition of zinc oxide, this pH being kept substantially constant by simultaneous addition of a base, and the product is separated off, washed, and dried and not ignited or only ignited at low temperatures of less than 250° C.

8. Process for the preparation of pigments according to claim 5, characterised in that substrates covered with an iron oxide layer or a layer containing iron oxide are used and these substrates are suspended in water, an acid aqueous solution of zinc chloride or zinc sulfate is added to the suspension at a pH favorable for the deposition of zinc oxide, this pH being kept substantially constant by simultaneous addition of a base, and the product is separated off, washed, dried, and ignited at temperatures of more than 650° C.

9. Process for the preparation of pigments according to claim 6, characterised in that substrates covered with a titanium oxide layer or a layer containing titanium oxide are used.

10. A method of using pigments according to claim 1 which comprises adding said pigments to plastics, coatings or cosmetics.

* * * * *